UNITED STATES PATENT OFFICE.

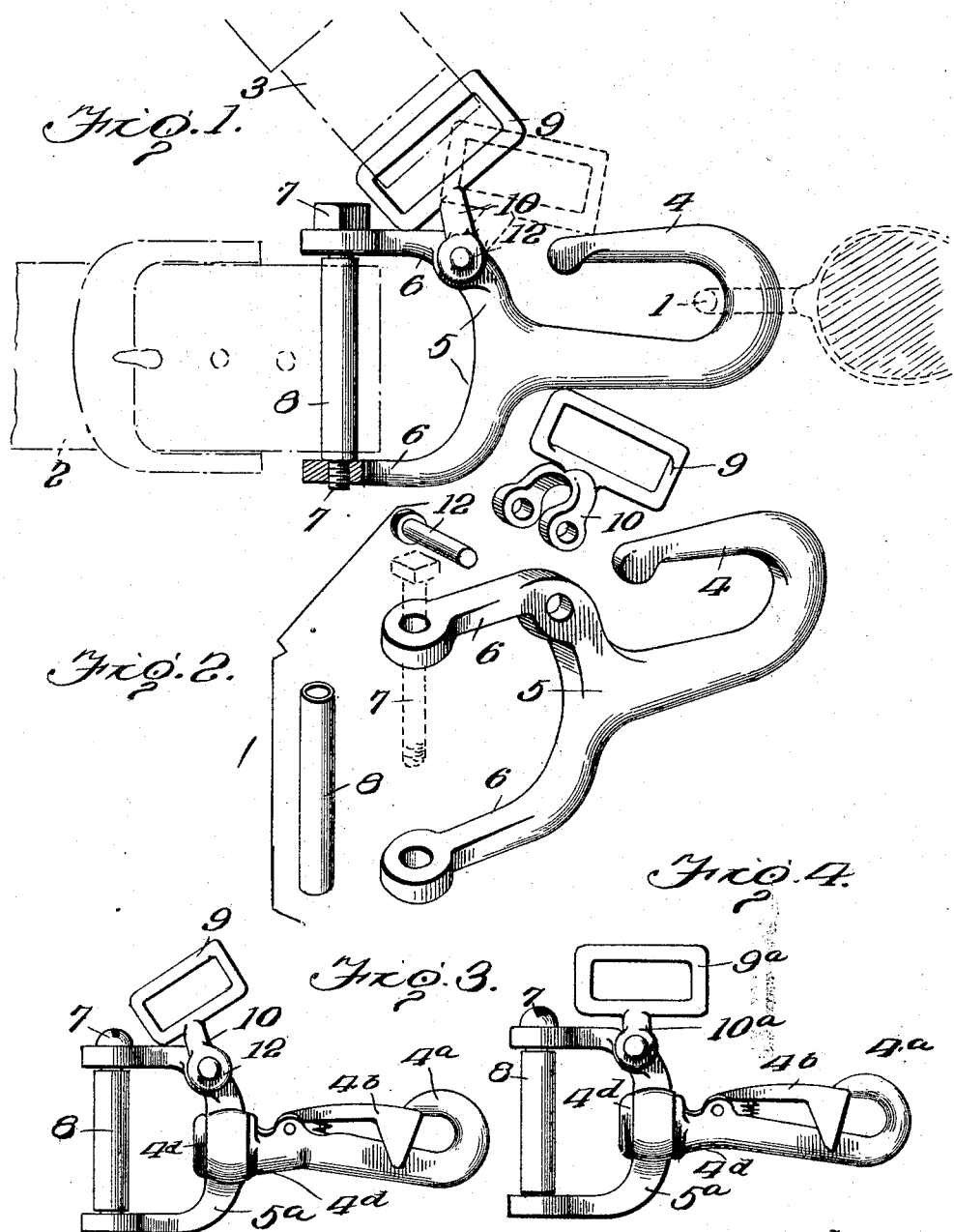
J. REICHERT.
NECK YOKE CONNECTOR AND THE LIKE FOR HARNESS.
APPLICATION FILED JULY 14, 1915.
1,192,119.
Patented July 25, 1916.

JOHN REICHERT, OF RACINE, WISCONSIN.

NECK-YOKE CONNECTOR AND THE LIKE FOR HARNESS.

1,192,119.

Specification of Letters Patent.

Patented July 25, 1916.

Application filed July 14, 1915. Serial No. 39,824.

*To all whom it may concern:*

Be it known that I, JOHN REICHERT, a citizen of the United States, residing at Racine, in the county of Racine and State of Wisconsin, have invented certain new and useful Improvements in Neck-Yoke Connectors and the like for Harness, being a continuation in part of my application filed January 16, 1915, Serial No. 2,611, of which the following is a specification.

This invention relates to certain improvements in neck yoke connectors and the like for harness; and the objects and nature of the invention will be readily understood by those skilled in the art in the light of the following explanation of the accompanying drawing illustrating what I now believe to be the preferred embodiment of the invention from among other forms and arrangements within the spirit and scope thereof.

An object of the invention is to provide a hook for connecting harness to neck yokes, with an improved arrangement of loop to receive a hame, jockey or equivalent strap.

A further object of the invention is to provide an improved hook particularly adapted to receive a breeching strap in the type of harness generally known as "side backers", and to couple the same to the neck yoke, chains or pole, and to provide said hook with a swingable loop to receive a hame, jockey or equivalent strap.

The invention consists in certain novel features in construction and in combinations and arrangements as more fully and particularly set forth and specified hereinafter.

Referring to the accompanying drawings:—Figure 1, is an elevation of a connector embodying my invention. Fig. 2 is a perspective view of a connector embodying my invention with the parts disconnected. Fig. 3, is an elevation of a modified form of a connector embodying my invention. Fig. 4, is an elevation of another modified form of a connector embodying my invention.

In the drawings, I show part of the eye 1, of a neck yoke; also part of a breeching strap 2, and of hame or jockey strap 3.

The connector, in the example illustrated by Fig. 1, consists of a hook 4, formed in one piece with an enlarged yoke having a vertically disposed cross portion 5, from which the shank of the hook centrally extends and a pair of spaced arms 6. The outer ends of the arms of the yoke are formed with alined perforations to receive a cross member, such as a removable bolt or pin 7, on which is mounted a removable roller 8. The breeching strap 2, is coupled to the hook through the medium of the roller 8, and pin 7, as will be readily understood by those skilled in the art. The breeching strap is connected to the neck yoke eye by means of the hook 4, which in the example illustrated by Fig. 1, has a rigid upwardly and rearwardly directed hook bill so that the opening into the hook is at the upper side of the hook shank. In the example illustrated by Fig. 1, the opening into the hook is guarded solely by a vertically swingable loop 9, to which the hame or jockey strap 3 is confined, and by which said hame or jockey strap is coupled to the connector to perform its well understood functions in harness of this type.

The loop 9, is in the form of a closed eye vertically arranged so that the general plane of the loop is approximately coincident with the general plane of the hook and its yoke. This loop is formed with a forked arm 10, extending downwardly from its lower side or cross bar and loosely straddling the upper corner of the yoke of the hook and joined thereto by a transverse pivot 12, on which the loop is vertically swingable from a position extending across and closing the opening into the hook with the forward end of the loop resting on the upper edge of the hook bill, to the position with the rear corner of the loop resting on the upper edge of the rear portion of the upper arm of the hook yoke with the upper cross bar of the loop in the inclined position it assumes when the horse is holding back on the breeching straps, or is backing. The pivot 12, can be removable, in the form of a removable screw, or it can be in the form of a permanent rivet on which the loop is freely swinging The arm 10, is preferably integral with the loop and extends downwardly from about the center of the lower cross bar of the loop, and in the preferred form this arm is not arranged at right angles to the length of the loop but obliquely or at an inclination, preferably downwardly and rearwardly, to give the loop an extended range of upward rearward swing. This peculiar arrangement of the arm 10, at an angle to the length of the loop permits a wider range for the strap carried by the loop to lean or extend rearwardly and downwardly. Thus, if a small horse be harnessed he will be farther from the end of the pole or neck yoke and lower and this will necessitate the loop moving rearwardly and downwardly. The same conditions might arise due to the length of the pole or neck yoke. When the conditions brought to light above, exist, it is seen that by thus placing the arm oblique to the length of the loop the strap carried thereby will lie in the same straight line with the width of the loop and bear evenly against the loop. This does away with placing the strain on one point of the strap and obviates the probability of the loop cutting or wearing through the strap. However for some purposes, if so desired, the arm 10ª, can be arranged at right angles to the loop 9ª, as shown in Fig. 4, of the drawings.

Various forms of hooks can be employed. For instance, in Figs. 3 and 4, I show the hook 4ª, having a spring actuated guard 4ᵇ, to form a snap hook, while the shank of the hook is loosely connected by a swivel or pivotal joint 4ᵈ, to the yoke 5ª, to the upper corner of which the loop 9, is pivotally joined and arranged in the manner illustrated by Fig. 1.

It will be noted that the vertically swingable loop is so mounted and arranged that when the animal is backing and the hame or jockey strap is pulling rearwardly on the connector through the medium of said loop, that the strain or pull is upwardly and rearwardly approximately longitudinally of the length of the hook, whereby certain advantages are attained.

It is evident that various changes and modifications might be resorted to without departing from the spirit and scope of my invention and hence I do not wish to limit myself to the exact disclosure hereof.

What I claim is:—

1. A device of the character substantially as described, comprising a hook provided with a yoke, said yoke in the same plane as said hook, and a loop pivotally mounted upon said yoke arranged in the same plane as said hook and yoke, and adapted to swing in a path coincident with the plane of said hook and yoke.

2. A neck yoke connector and the like for harness, comprising a hook having an upwardly extending bill, said hook at its rear end having a vertically arranged yoke, and a vertically swingable loop joined to the upper side of said yoke by a transverse pivot to swing forwardly onto said bill and rearwardly onto the upper rear portion of said yoke.

3. A device of the character substantially as described, comprising a hook formed at its rear end with a yoke, said yoke in the same plane as said hook, said hook having an upwardly and rearwardly extending hook bill and provided in rear of the hook bill with a loop adapted to swing in a path in the plane of said hook and yoke.

4. A neck yoke connector and the like for harness, comprising a hook formed at its rear end with means for detachably receiving a breeching strap, and at its upper side provided with a hame strap loop swingable in the plane of the hook, said loop formed with an arm extending downwardly therefrom at an inclination and pivotally joined to said hook, the arrangement being such that said loop may act as a guard for said hook, substantially as described.

5. A device of the character substantially as described, comprising a hook formed at its rear end with means for detachably receiving a strap, a loop having an arm extending downwardly and at an acute angle to the lower bar of said loop, and a pivot carried by said hook, said arm being so arranged that said loop may swing forwardly at an inclination to close the mouth of said hook and rearwardly at a greater inclination to the shank of said hook.

6. A device of the character substantially as described, comprising a hook, and means adapted to receive a strap pivotally mounted on the upper side of said hook, said means arranged to swing forwardly to close said hook and rearwardly to permit a strap carried thereby to approach the horizontal.

7. A device of the character substantially as described, comprising a hook, a yoke extending rearwardly from said hook and in the same plane therewith, and means pivotally mounted upon the rear of said hook and adapted to carry a strap, said means arranged to swing forwardly upon said hook and rearwardly upon said yoke.

In testimony whereof I affix my signature in the presence of two witnesses.

JOHN REICHERT.

Witnesses:
L. W. MILLS,
CHAS. SALBREITER.